Figure 1:
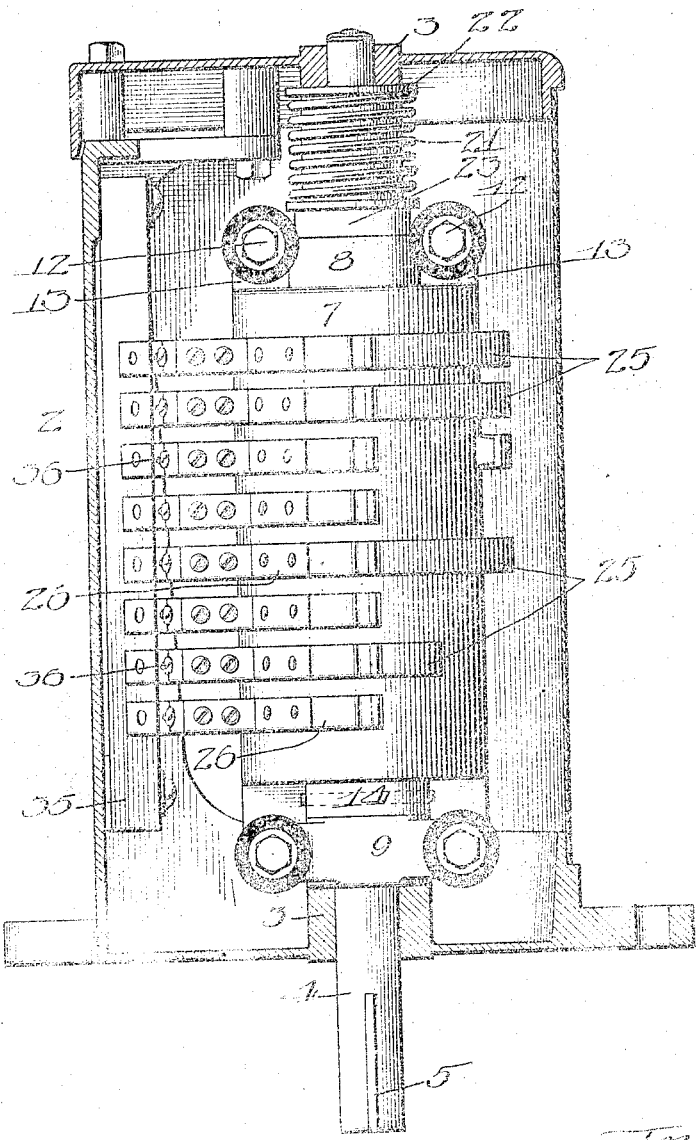

T. E. BARNUM.
MOTOR CONTROLLING DEVICE.
APPLICATION FILED MAR. 14, 1907.

1,016,059.

Patented Jan. 30, 1912.
5 SHEETS—SHEET 1.

Witnesses:

Inventor:
Thomas E. Barnum
By Edwin B. H. Tower Jr.
atty

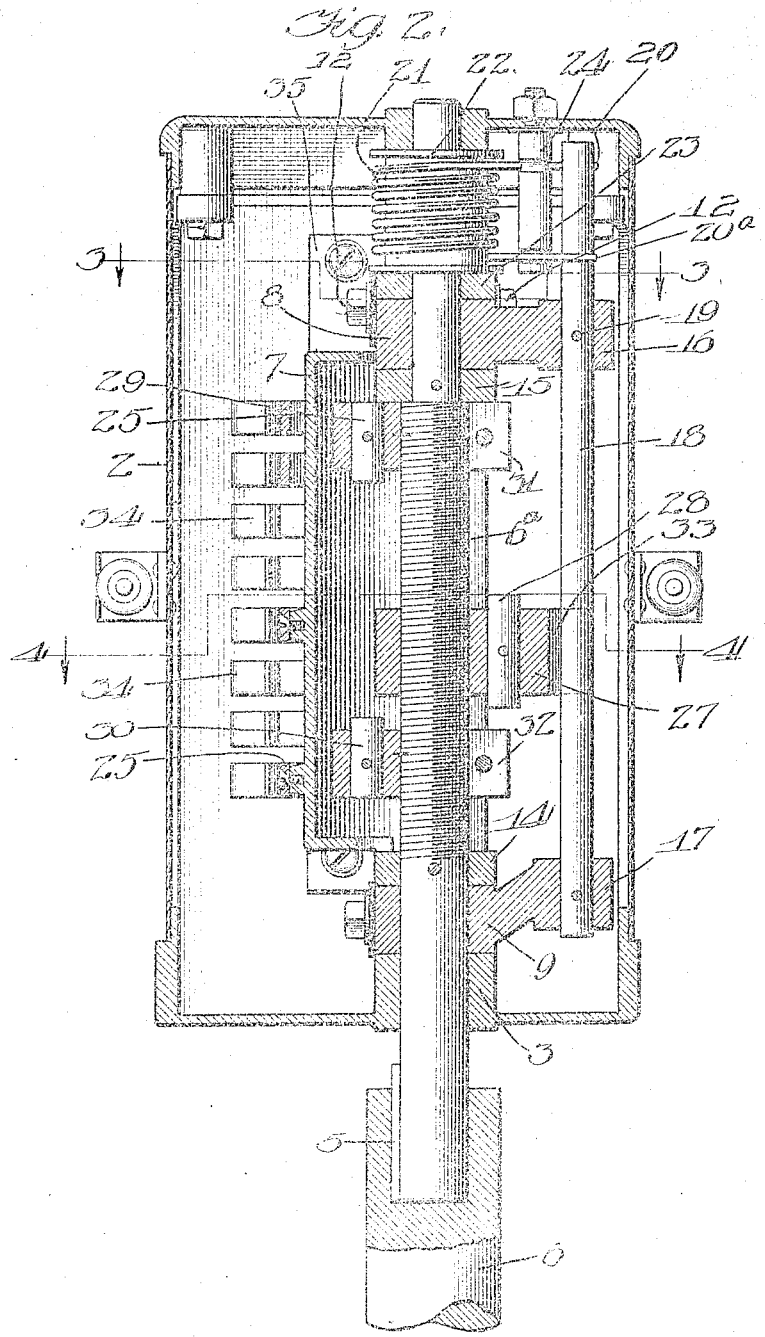

T. E. BARNUM.
MOTOR CONTROLLING DEVICE.
APPLICATION FILED MAR. 14, 1907.
1,016,059.
Patented Jan. 30, 1912.
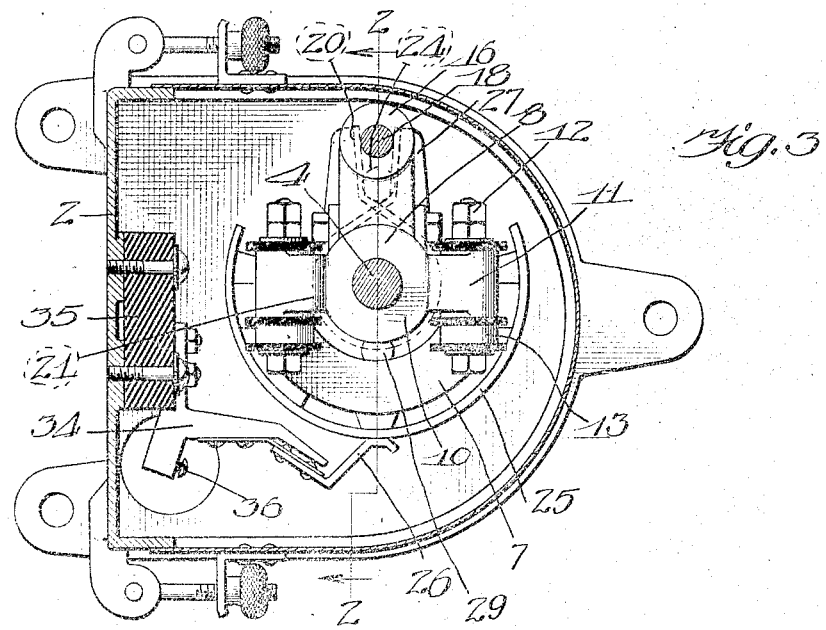
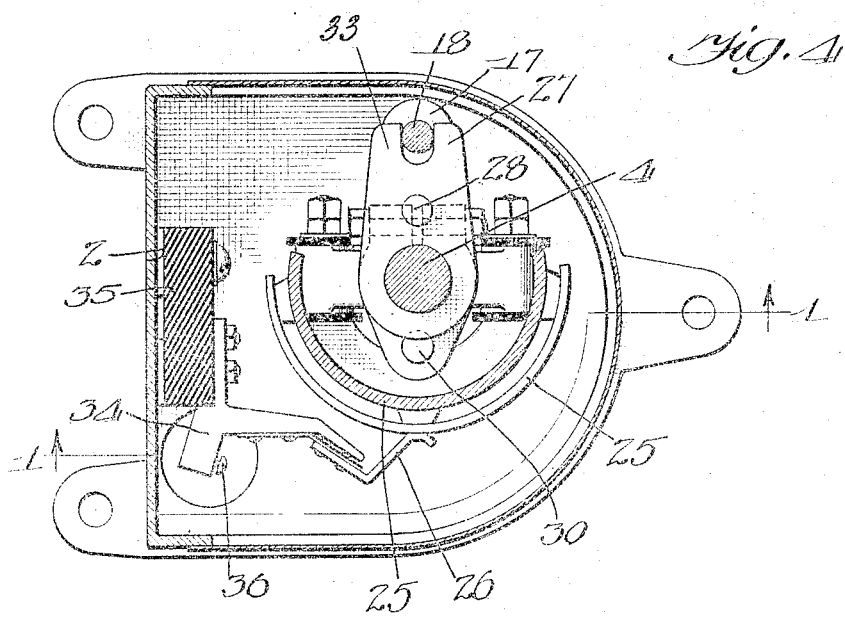

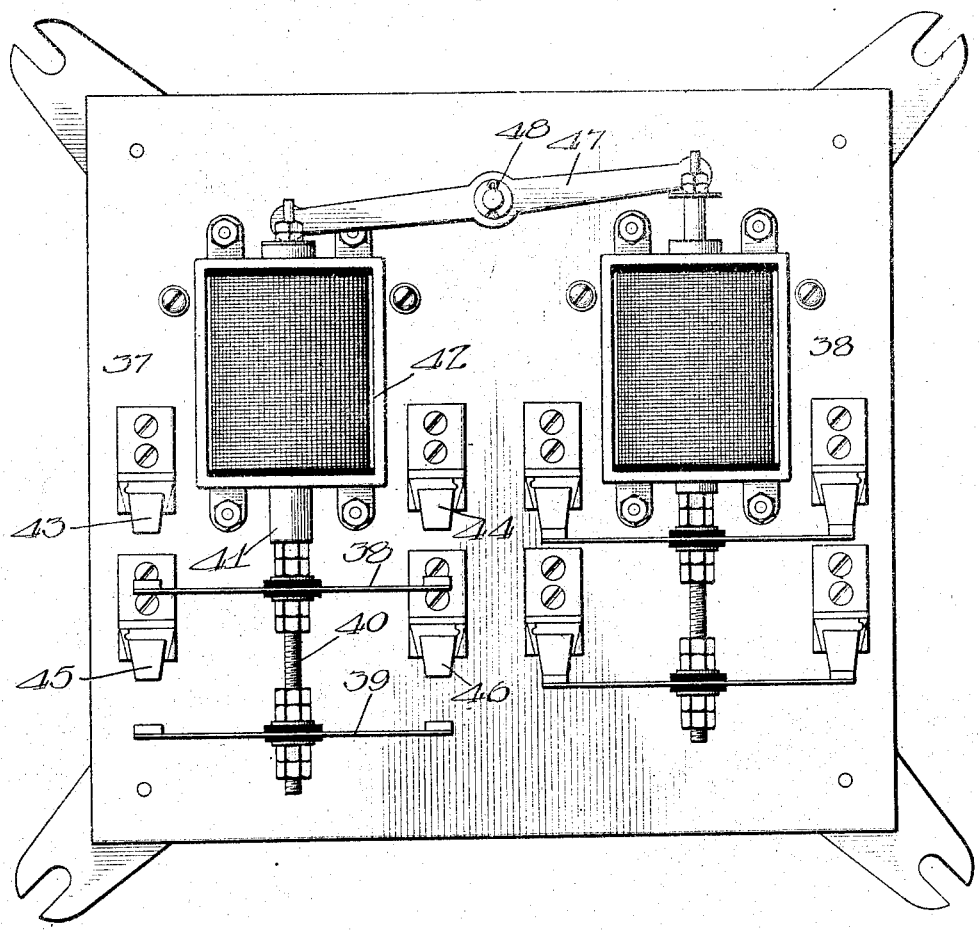

T. E. BARNUM.
MOTOR CONTROLLING DEVICE.
APPLICATION FILED MAR. 14, 1907.
1,016,059.
Patented Jan. 30, 1912.
5 SHEETS—SHEET 5.
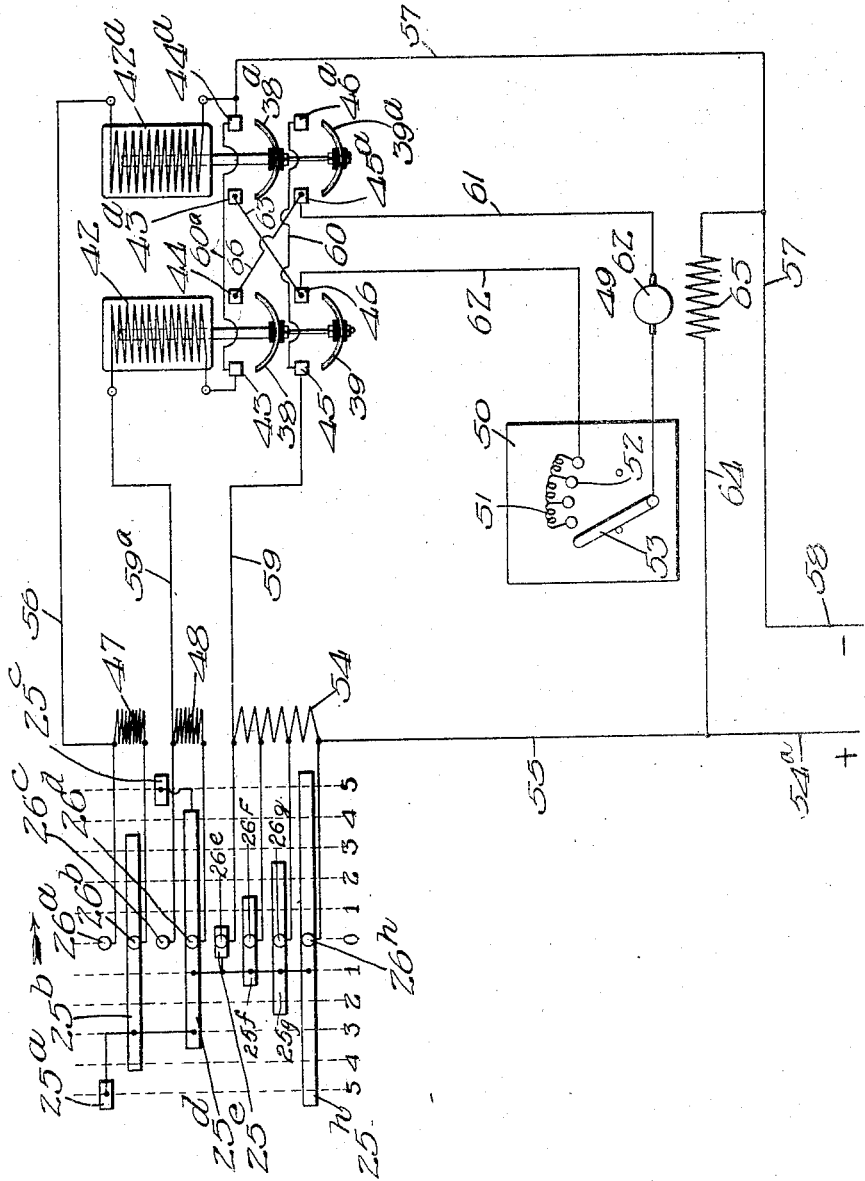

UNITED STATES PATENT OFFICE.

THOMAS E. BARNUM, OF MILWAUKEE, WISCONSIN, ASSIGNOR TO THE CUTLER-HAMMER MANUFACTURING COMPANY, OF MILWAUKEE, WISCONSIN, A CORPORATION OF WISCONSIN.

MOTOR-CONTROLLING DEVICE.

1,016,059.  Specification of Letters Patent.  Patented Jan. 30, 1912.

Application filed March 14, 1907. Serial No. 362,351.

*To all whom it may concern:*

Be it known that I, THOMAS E. BARNUM, a citizen of the United States, residing at Milwaukee, in the county of Milwaukee and State of Wisconsin, have invented new and useful Improvements in Motor-Controlling Devices, of which the following is a full, clear, concise, and exact description, reference being had to the accompanying drawing, forming a part of this specification.

My invention relates to improvements in motor controlling devices, one of the objects being to provide a controller which will be so operated from the mechanism driven by the motor, that it will periodically reverse the direction of operation of the motor, and is particularly designed for operating washing machines and the like.

While my controller is particularly adaptable for direct connection with the mechanism driven by the motor, it will be understood that it does not necessarily have to be so connected, and may be operated in any other desired manner.

For the purpose of disclosing my invention, I have illustrated in the accompanying drawings, one embodiment thereof.

In said drawings: Figure 1 is a side elevation of my controller, the casing being in section to disclose the interior of the controller. Fig. 2 is a sectional view taken on the line 2—2 of Fig. 3. Fig. 3 is a transverse section of my controller taken on the line 3—3 of Fig. 2. Fig. 4 is a transverse section taken on the line 4—4 of Fig. 2. Fig. 5 is an elevation of the motor reversing switches, and Fig. 6 is a diagrammatic view of the circuit arrangement of my invention.

In the embodiment of my invention illustrated, I provide a suitable inclosing and supporting casing 2, having formed in the top and bottom thereof, a pair of journals 3, in which operates a vertically extending shaft 4. One end of this shaft is provided with an extension, having a key 5 formed thereon, by which it may be secured to the shaft 6 of the mechanism operated by the motor. An intermediate portion of the shaft 4 is screw-threaded, as at $6^a$, for a purpose which will be fully described hereinafter.

Mounted upon the shaft 4 is a semi-cylindrical drum 7 secured in position by means of an upper bracket 8, and a lower bracket 9. Each bracket comprises a collar 10, having a pair of arms 11, through which are arranged to pass bolts 12, which clamp against the ends of the arms 11, lugs or projections 13, integrally united with the bottom and top of the drum 7. These brackets are maintained in position upon the shaft 4, by spacing collars 14 and 15. The collars 10 of the upper and lower brackets are provided with laterally extended arms 16 and 17, which support a vertically extending rod 18. This rod is preferably supported in position upon the arm by pins 19, which pass through the rod and through the arms 16 and 17. The upper end of the rod 18 extends between the ends 20 and $20^a$ of a coiled spring 21 mounted upon a drum 22, loosely surrounding the shaft 4, and maintained in position between a collar 23 and the upper journal 3 of the shaft. The ends 19 and $20^a$ of the spring also bear against a downwardly projecting stud 24, secured to the top of the casing. By this arrangement the spring always exerts a tendency to return the rod 18 to a central position, when the same moves to one side or the other. As before stated, the drum 7 is connected with the arms 16 and 17 to move therewith, but the arms 16 and 17 do not normally rotate with the shaft 4. The arm moves the drum 7 to one side or the other from its central position to cause the contacts 25, carried on the periphery of the drum, to engage the contact fingers 26. For operating the arm, a traveling nut 27 is mounted upon the shaft 4, and is provided with a dog 28 arranged to engage with dogs 29 and 30, carried by the split rings 31 and 32, mounted upon and rotatable with the shaft 4. The nut 27 has a pair of arms 33, which extend on either side of the rod 18. The nut 27 travels up or down on the threaded portion $6^a$ of the shaft, as the shaft is rotated, and when it has reached either limit of its travel, the dog 28 is engaged by either of the dogs 29 or 30, and the nut rotates with the shaft until the direction of rotation of the shaft is changed. The fingers 26, arranged to engage the contacts on the periphery of the drum 7 are mounted upon suitable supports 34 secured to an insulating base 35, in turn secured upon the back of the casing 2. Suitable binding posts 36 are provided upon the supports 35, whereby the proper electrical connections may be made with the contact fingers 26. The contacts 25 on the drum 7 are arranged in the proper sequence to operate reversing the switches for closing the circuit through the motor in one direction when the drum is in one predetermined position, and to close the circuit through the motor in an opposite direction, when the drum is in another predetermined position.

For the purpose of more fully describing the operation of the controller, we will assume that when the controller is moved in a clock-wise direction, the motor is driven ahead and when the controller is moved in a counter clock-wise direction, the motor is reversed. With the traveling nut 27 in the position illustrated in the drawings, the motor will continue to operate, until the nut has moved up sufficiently for the dog 29 to engage the dog 28. The nut will then be turned in a clock-wise direction, carrying with it, against the tension of the spring 21, the arm 18, which moves the drum 7 in a clock-wise direction. This will reverse the current through the motor, thereby reversing the direction of operation of the shaft 4, and the arm will return, under the action of the spring 21, to its central position, while the nut 27 will travel downwardly on the threaded portion $6^a$ of the shaft 4, until the dog 28 thereof engages the dog 30, when the nut will be turned in a counter clock-wise direction, causing the drum 7 to rotate in a counter clock-wise direction, and thereby reversing the direction of the operation of the motor. It will thus be seen that the position of the drum 7 is alternately at predetermined intervals reversed, thereby reversing the direction of operation of the motor. The contacts of the drum 7 control a pair of reversing switches 37 and 38. Each of the reversing switches comprises a pair of spring arms 38 and 39, suitably mounted upon a tail rod 40 of the core 41 of an operating solenoid 42. The contacts 38 and 39 are arranged to bridge the contacts 43 and 44 and 45 and 46 respectively. The upper ends of the cores of the solenoid of the switches 37 and 38 are interlocked by a rod 47, pivoted at 48, in such a manner that one can not be opened without closing the other.

In the diagrammatic view illustrated in Fig. 6, I have shown the circuit arrangement for the operation of my controller. For the sake of clearness, the various contact fingers 26 shall be identified by the numerals $26^a$ to $26^h$, and the contacts on the drum 7 shall be identified by the numerals $25^a$ to $25^h$. The upper contacts of the reversing switches shall be identified by the numerals 43 and $43^a$, 44 and $44^a$. The lower contacts shall be identified by the numerals 45 and 46 and $45^a$ and $46^a$, while the switches shall be identified by the numerals 38 and 39 and $38^a$ and $39^a$. The solenoids for operating the switches shall be identified by the numerals 42 and $42^a$. In practice the drum 7 is formed of conducting material such as iron, and the contacts carried by the same are therefore all electrically connected. In the diagrammatic view, for clearness, I have shown the contacts of the drum as being suitably connected by conductors. A resistance 47 is provided for winding of the solenoid $42^a$, and a second resistance 48 is provided for the winding of the solenoid 42. The motor 49 is connected with a suitable starting box 50, having a resistance 51 divided in section and connected with contacts 52, over which is arranged to sweep a contact arm 53. A second resistance 54 is also provided for the motor, which is controlled from the controller.

In operation, we will assume that the traveling nut 32 has caused the drum to move in the direction of the arrow until the contact $25^a$ engages the contact finger $26^a$, and that while the contact $25^a$ rests on $26^a$, the arm of the starting box 50 is moved into engagement with the first of the series of contacts 52. Under these conditions a circuit will be established from the positive side $54^a$ of the line by conductor 55, to the contact finger $26^h$, and thence through the drum 7, to the contact $25^a$, from there to contact finger $26^a$, thence by conductor 56, through the winding of the solenoid $42^a$, and by conductor 57, to the negative side 58 of the line. The winding of the solenoid $42^a$, is thus energized and closes switches $38^a$ and $39^a$, which completes the motor circuit from the conductor 55, through the resistance 54, by conductors 59 and 60, across the switch $39^a$, conductor 61, through the armature 62 of the motor, through the starting box 50, conductors 62 and 63, across the switch $38^a$ and thence by conductor 57 to the negative side 58 of the line. The field circuit of the motor extends from the positive side of the line, by conductor 64, through the field winding 65, and by conductor 57 to the negative side 58 of the line. As the arm 53 is moved in a clock-wise direction, the starting resistance is cut out of the motor circuit, and the speed of the motor increases. The drum of the controller now slowly moves under the influence of the spring 21 to a position where the contact $25^b$ engages the contact finger $26^b$ and the contact $25^a$ passes off the contact finger $26^a$. This inserts the resistance 47 in series with the winding of the solenoid $42^a$, which cuts down the strength of the solenoid to such an extent that while it will maintain the switches $38^a$ and $39^a$ in a closed position, it will not close them in event they open. A continued movement of the drum causes the contacts 25$^e$, 25$^f$ and 25$^g$ to successively engage the contact fingers 26$^e$, 26$^f$, and 26$^g$, thereby cutting out the resistance 54, section by section, from the motor circuit and increasing the speed of the motor. The drum has now reached a central position or the position indicated in the diagrammatic view, and the motor is running at full speed ahead. The nut on the threaded portion 6 of the shaft continues to travel downwardly, until it is engaged by the dog 30, which rotates the drum in a reverse direction from its center, and finally the contact 25$^b$ passes off the contact finger 26$^b$, permitting the switches 38$^a$ and 39$^a$ to open, momentarily opening the circuit of the motor, until the contact 25$^c$ engages contact finger 26$^c$. As soon as this occurs, a circuit will be established from the positive side 54$^a$ of the line, through conductor 55, contact finger 26$^h$, thence to contact 25$^h$, through the drum to the contact 25$^c$, contact finger 26$^c$, conductor 59$^a$, through the winding of the solenoid 42, conductor 60$^a$, and by conductor 57 to the negative side 58 of the line. The energization of the solenoid 42 closes switches 38 and 39, and establishes the armature circuit from conductor 55, through all of the resistance 54, by conductor 59, across the switch 39, by conductor 62, through the starting box 50, through the armature 62, by conductors 61 and 66, across switch 38, and by conductors 60 and 57, to the negative side 58 of the line. It will be noted that the current by this circuit passes through the armature in a direction reverse to that previously described, and the direction of operation of the motor will therefore be reversed. As the direction of the operation of the motor is reversed, the direction of operation of the shaft 4 of the controller will also be reversed, permitting the drum 7 to move back under the influence of the spring 21, toward the central position. As soon as the contact 25$^c$ has moved off the contact finger 26$^c$, the contact 25$^d$ will close a circuit by the finger 26$^d$, through the winding of the solenoid 42, which includes the resistance 48, thereby reducing the strength of the winding to such an extent that while it will maintain the switches 38 and 39 closed, it will not raise the same in event they drop.

While I have described one embodiment of my invention, it will be understood that various changes and modifications may be made therein, without departing from the spirit of my invention.

Having thus described my invention what I claim as new and desire to obtain by Letters Patent is:

1. The combination with a motor, of electro-magnetically operated and retained means for controlling the direction of operation thereof, and a controller operated by the mechanism driven from the motor for controlling the operation of said electro-magnetic means to periodically change the direction of operation of the motor automatically.

2. The combination with a motor, of electro-magnetic means for controlling the direction of operation thereof, and a controller having a movable member, the direction of movement of which is periodically changed to control the operation of said electro-magnetically operated means to change the direction of operation of the motor automatically, said controller when operated being also adapted to vary the speed of the motor.

3. The combination with a motor, of electro-magnetically operated means for controlling the direction of operation thereof, and a controller having its movable member operating alternately in opposite directions for controlling the speed of the motor and controlling said electro-magnetically operated means to periodically change the direction of operation of the motor automatically.

4. The combination with a motor, of a plurality of separately actuated switches for controlling the direction of current through one of the elements of said motor, and continuously operated means for causing said switches to operate alternately.

5. The combination with a motor of a plurality of switches for controlling the direction of current through one of the elements thereof, an electro-responsive device for each switch, and a continuously operated movable member for alternately energizing the electro-responsive device of said switches to periodically change the direction of operation of the motor.

6. The combination with a motor, of a plurality of switches for controlling the direction of operation thereof, a resistance for said motor, and an automatically movable member for causing said switches to periodically reverse said motor, said movable member being adapted to first insert and then remove said resistance from the motor circuit upon each reversal thereof.

7. The combination with a motor, of a plurality of switches for controlling the direction of current through one of the elements of said motor, a controller for controlling said switches and a resistance for the motor, and means for operating said controller to cause said switches to operate to periodically change the direction of operation of the motor, and to insert and gradually cut out the motor resistance.

8. In a controller, the combination with a rotatable member, of contacts carried thereby, stationary contacts adapted to be engaged by the contacts on said rotatable member, a shaft, a traveling nut mounted thereon, means at one limit of travel of said nut for causing the same to move said rotatable member in one direction and means at the opposite limit of travel of said nut for causing the same to move said rotatable member in an opposite direction.

9. The combination with a motor, of a plurality of switches for controlling the direction of operation of said motor, an electro-responsive devices, which when moved in said switches, a controller for automatically controlling the current through said electro-responsive devices, which when moved in one direction closes an operative circuit through one of said electro-responsive devices, and when moved in an opposite direction closes an operative circuit through the other of said electro-responsive devices.

10. The combination with a motor, of a plurality of switches for controlling the direction of operation of said motor, an electro-responsive device for operating each of said switches, an automatic controller adapted when moved in one direction, to close an operative circuit through one of said electro-responsive devices, and when moved in an opposite direction to close the circuit through the other electro-responsive device, and means for automatically reversing the direction of movement of said controller.

11. The combination with a motor of a plurality of switches for controlling the direction of current through one of the elements thereof, a plurality of electro-responsive devices for operating said switches, a controller which when moved in one direction closes an operative circuit through one of said electro-responsive devices and inserts and gradually cuts out a resistance in the motor circuit, and when moved in an opposite direction, closes an operative circuit through the other of said switches, and inserts and gradually cuts out a resistance in the motor circuit.

12. In a controller, the combination with a rotatable drum, of contacts carried thereby, stationary contacts adapted to be engaged by the contacts on said drum, a shaft, a traveling member mounted thereon and means fixed to said shaft for causing said member to rotate said drum at the limits of its movement.

13. In a controller, the combination with a rotatable drum, of contacts carried thereby, stationary contacts adapted to be engaged by the contacts on said drum, a shaft, a traveling member mounted thereon, and means adjustably mounted on said shaft for limiting the range of movement of said member and causing the same to rotate said drum upon reaching the limits of its movement.

14. In a controller, the combination with a rotatable drum, of contacts carried thereby, stationary contacts adapted to be engaged by the contacts on said drum, a shaft, a traveling member mounted on said shaft and connected to said drum and means arranged at each limit of travel of said member to operate the same to rotate said drum alternately in opposite directions.

15. In a controller, the combination with a shaft, of a drum loosely mounted thereon, means tending to move said drum to a predetermined position, contacts carried by said drum, stationary contacts adapted to be engaged by the contacts on said drum, a traveling member mounted on said shaft and connected to said drum, and means arranged at each limit of travel of said member for operating the same to rotate said drum against the tendency of said first mentioned means to rotate said drum in an opposite direction.

16. In a controller, the combination with a screw-threaded shaft, of a drum loosely mounted thereon, contacts carried by said drum, stationary contacts arranged to be engaged by the contacts on said drum, a nut arranged to travel on the screw-threaded portion of said shaft and connected to said drum, and stops arranged on said shaft for causing said nut to rotate with said shaft upon reaching the limits of its travel to rotate said drum alternately in opposite directions.

17. In a controller, the combination with a screw-threaded shaft, of a drum loosely mounted thereon, contacts carried by said drum, stationary contacts arranged to be engaged by the contacts on said drum, a nut arranged to travel on the screw-threaded portion of said shaft and connected to said drum, and limiting devices adjustably mounted on said shaft for causing said nut to rotate with said shaft upon reaching the limits of its travel to alternately rotate said drum in opposite directions.

18. In a controller, the combination with a screw-threaded shaft, of a drum loosely mounted thereon, arms extending laterally from said drum, a rod supported by said arms, means tending to move said drum to a central position, contacts carried by said drum, stationary contacts adapted to be engaged by the contacts on said drum, a nut arranged to travel on the screw-threaded portion of said shaft and to engage said rod, and devices adjustably mounted on said shaft for limiting the travel of said nut and for causing said nut to rotate with said shaft at the limits of its travel to rotate said drum alternately in opposite directions.

19. In a controller for electric motors, the combination, with an automatically operated reversing relay, of a controlling device for said relay, and a traveling member adapted to periodically operate said controlling device to cause said reversing relay to periodically reverse the operation of the motor.

20. The combination with a motor of a reversing relay therefor, a resistance for said motor, a controller for controlling said relay and resistance comprising a drum and a traveling member adapted when in one position to rotate the drum in one direction, and when in another position to rotate the drum in an opposite direction.

21. In a controller for electric motors, the combination with an electromagnetically operated reversing relay, a drum for controlling the operation of said reversing relay, and a traveling member adapted to periodically change the position of said drum to cause said reversing relay to periodically reverse the operation of the motor, said drum being adapted to also control the speed of the motor.

22. The combination with a motor of a relay device for controlling the direction of operation thereof, a resistance for said motor, and a controller for controlling said relay and resistance, comprising a shaft, a drum loosely mounted thereon, a traveling member connected with said drum, and means arranged with each limit of travel of said member to operate the same to rotate the drum with the shaft.

23. The combination with a motor of a plurality of switches for controlling the direction of operation of the same, a plurality of electro-responsive devices for operating said switches, and a controller for controlling the operation of said electro-responsive devices comprising a shaft, a contact drum loosely mounted thereon, a traveling member on said shaft connected with the drum, and means arranged at each limit of travel of said member to operate the same to rotate the drum with the shaft.

24. The combination with a motor of a plurality of switches for controlling the direction of operation thereof, a plurality of electro-responsive devices for operating said switches, a resistance arranged to be inserted and gradually cut out of motor circuit upon each reversal thereof, and a controller for controlling the operation of said electro-responsive devices, and said resistance comprising a shaft rotating alternately in opposite directions by said motor, a drum loosely mounted on said shaft, a traveling member connected with said drum, and means arranged at each limit of travel of said member to operate the same to rotate said drum with the shaft.

25. In a controller for electric motors, the combination, with a plurality of automatically operated switches for controlling the direction of operation of the motor, a resistance for the motor, a controller for controlling the operating means of said switches and said resistance and tending to stand in position to remove said resistance from circuit, said controller being movable in opposite directions to insert said resistance and cause said switches to reverse the operation of the motor and automatic means for periodically moving said controller in opposite directions.

26. In a controller for electric motors, the combination, with a plurality of switches for controlling the direction of operation of the motor, an operating winding for each of said switches, a resistance for the motor, a controlling drum for controlling the circuits of said winding and said resistance and tending to stand in position to remove said resistance from circuit, and a traveling member adapted to periodically move said drum in opposite directions to alternately energize the windings of said switches and to insert said resistance in circuit.

27. In a controller for electric motors, the combination, with a resistance, of a rotatable drum for controlling the same, said drum when in a central position being adapted to remove said resistance from circuit, a traveling member adapted, upon reaching the limits of its movement, to actuate said drum to insert said resistance in circuit, and means for automatically returning said drum to central position to gradually remove said resistance from circuit.

28. In a controller for electric motors, the combination, with a resistance, of a shaft, a drum rotatably mounted on said shaft and adapted when in a central position to remove said resistance from circuit, said drum being movable in opposite directions to insert said resistance in circuit, a traveling nut mounted on said shaft, means at the limits of movement of said nut for causing the same to rotate said drum alternately in opposite directions and means for returning said drum to its central position upon reversal of movement of said traveling nut.

29. In a controller for electric motors, in combination, means adapted to be operated to successively slow down the motor, reverse the direction of operation thereof and then accelerate the same, and means operated by the motor for automatically operating said first mentioned means periodically, said first mentioned means including electro responsive switches for controlling the direction of operation of the motor.

In witness whereof, I have hereunto subscribed my name in the presence of two witnesses.

THOMAS E. BARNUM.

Witnesses:
OSCAR A. KELLER,
A. H. BARNICKEL.